United States Patent [19]
Hönig et al.

[11] Patent Number: 5,905,103
[45] Date of Patent: May 18, 1999

[54] PIGMENT PASTE RESINS FOR CATHODICALLY DEPOSITABLE COATING COMPOSITIONS

[75] Inventors: Helmut Hönig; Georg Pampouchidis; Willibald Paar; Herbert Matzer; Manfred Valtrovic, all of Graz, Austria

[73] Assignee: Vianova Resins, AG, Graz, Austria

[21] Appl. No.: 08/032,178

[22] Filed: Mar. 15, 1993

Related U.S. Application Data

[63] Continuation of application No. 07/739,854, Aug. 2, 1991, abandoned.

[30] Foreign Application Priority Data

Aug. 2, 1990 [AT] Austria ................................. 1630/90

[51] Int. Cl.$^6$ ........................... C08G 65/26; C08L 63/00; C25D 9/00
[52] U.S. Cl. ........................... 523/404; 523/414; 523/415; 523/417; 523/420; 525/523; 525/528; 525/529; 525/531; 528/45; 528/73; 528/103; 528/107; 528/110; 528/111; 528/117

[58] Field of Search ....................... 523/404, 414, 523/415, 417, 420; 525/523, 528, 531, 529; 528/107, 45, 103, 117, 73, 110, 111

[56] References Cited

U.S. PATENT DOCUMENTS

| | | | |
|---|---|---|---|
| 4,683,285 | 7/1987 | Paar et al. | 523/415 |
| 4,698,141 | 10/1987 | Anderson et al. | 523/415 |
| 4,837,291 | 6/1989 | Paar | 525/504 |
| 4,968,730 | 11/1990 | Honig et al. | 528/103 |

*Primary Examiner*—Frederick Krass
*Attorney, Agent, or Firm*—Breiner & Breiner

[57] ABSTRACT

The invention relates to a process for the preparation of pigment paste resins for cathodically depositable coating compositions, wherein diepoxide compounds which contain polyoxyalkylene structures and alkyl and/or alkylene and/or hydroxyalkyl radicals having more than 3 carbon atoms are first reacted to form epoxy resin/amine adducts and final products with oxazolidine structures are obtained by a partial or complete reaction of secondary amino groups with formaldehyde.

9 Claims, No Drawings

PIGMENT PASTE RESINS FOR CATHODICALLY DEPOSITABLE COATING COMPOSITIONS

This is a continuation of application Ser. No. 07/739,854 filed on Aug. 2, 1991 now abandoned.

FIELD OF INVENTION

The invention relates to cathodically depositable coating compositions. More particularly, the invention relates to a process for the preparation of modified epoxy resins, to the resins produced, and to their use as pigment paste resins for cathodically depositable coating compositions.

BACKGROUND OF INVENTION

Pigment paste resins are an important component of cathodically depositable coating compositions and exert substantial influence on the bath parameters and on physical and chemical characteristics of the paint films.

Pigment paste resins based on epoxy resins are disclosed in U.S. Pat. No. 3,936,405 and U.S. Pat. No. 4,035,275. These patents are directed to cationic water-thinnable polymers which are obtained by the reaction of polymers containing 1,2-epoxide groups, especially of polyglycol-modified epoxy resins, with amine salts and with mixtures of phosphine acids and sulphide acids giving rise to onium groups.

Similar products to those obtained in U.S. Pat. Nos. 3,936,405 and 4,035,275 which are crosslinked by transurethanization are disclosed in DE-PS 2,634,211, DE-OS 2,634,229, or DE-OS 2,928,769. Pigment wetting of resins crosslinkable by transesterification can be enhanced by the introduction of quaternary ammonium groups, and their use as pigment grinding resins is thereby made possible. This variant is disclosed, for example, in DE-OS 3,322,781. To improve the stability of these pigment pastes, DE-OS 3,622,710 suggests formation of quaternary ammonium groups in the presence of the pigment powder.

Pigment paste resins which yield coatings with improved corrosion resistance are obtained, according to EP-A1-0,107,088, by reacting monoepoxides, such as alkylene oxides, glycidyl esters or glycidyl ethers, with long-chain tertiary amines in the presence of an acid and/or water with the formation of quaternary ammonium groups. According to EP-A1-0,107,098, higher pigment loading is possible if these systems additionally contain amide groups. EP-B1-0,107,089 discloses that polyepoxides can be reacted in the same manner whereby processing using higher proportions of pigments is made possible.

Pigment paste resins based on alkylphenol-modified epoxy resins containing sulphonium groups, such as those disclosed in EP-A2-0,251,772, are alleged to permit formation of thicker films.

In another type of a pigment paste resin disclosed in EP-A1-0,199,473, an epoxidized polybutadiene is reacted with a secondary amine, and the addition of an acid and a monoepoxide leads to the introduction of quaternary ammonium groups.

Pigment paste resins based on epoxy resins, comprising oxazolidine groups, are disclosed, for example, in AT-PS 365,214 and AT-PS 380,264. Resins of this type exhibit good general characteristics and are commercially used in spite of having poor dispersibility characteristics in the bath material.

It is apparent from the voluminous literature in the field of pigment paste formulations for cathodically depositable coating compositions that this is a problem area for which there is still no completely satisfactory solution in spite of research which has extended over a number of years and in spite of numerous suggestions.

SUMMARY OF INVENTION

U.S. Pat. No. 4,968,730 describes a process for the preparation of pigment paste resins wherein a modified or unmodified epoxy resin having a glass transition temperature between 10 and 40° C. is reacted with a primary-tertiary diamine. The secondary amino groups formed are then reacted with formaldehyde to furnish oxazolidine groups, and the tertiary amino groups are quaternized using an organic acid and a monoglycidyl compound. It has now been found that good pigment pastes can be obtained without quaternization if the epoxide resins starting materials contain a sufficient number of polyoxyalkylene structures.

The present invention, therefore, relates to a process for the preparation of pigment paste resins based on modified epoxy resins for cathodically depositable coating compositions, characterized in that (A) a diepoxide compound, or a mixture of several diepoxide compounds, which contain, based on their total weight, 10 to 50% by weight of polyoxyalkylene structures, and up to 20% by weight, preferably 5 to 15% by weight, of alkyl and/or alkylene and/or hydroxyalkyl radicals with more than 3 carbon atoms, and have a glass transition temperature between 10 and 40° C., is reacted with (B) 50 to 100 mol%, based on the free epoxide groups in (A), of a primary-tertiary diamine, preferably an N,N-dialkylaminoalkylamine, and (C) any remaining free epoxide groups are reacted with a primary or secondary amine either at the same time or subsequently, if desired, and (D) the reaction product is reacted with 50 to 100 mol% of formaldehyde, based on the total of the primary amino groups of the amines used in (B) and (C), with the formation of oxazolidine structures.

The invention further relates to pigment paste resins prepared according to the aforesaid process and to their use for cathodically depositable coating compositions.

The products prepared according to the present invention possess in both concentrated and dilute form a stability which meets commercial requirements. Because of their rheology the pastes are readily processed, ensure formation of defect-free films both in deposition and crosslinking and do not negatively affect the properties of the applied films. This is true with all of the pastes falling within the scope of the present invention.

Component (A) used according to the present invention consists of one or more diepoxide compounds which contain, based on their total weight, 10 to 50% by weight of polyoxyalkylene structures, and up to 20% by weight, preferably 5 to 15% by weight, of alkyl and/or alkylene and/or hydroxyalkyl radicals with more than 3 carbon atoms, and have a glass transition temperature between 10 and 40° C.

The required polyoxyalkylene structures can be obtained by employing diepoxide compounds having structures which are linked with diepoxide compounds based on polyphenols, as well as by chain lengthening of such polyphenol epoxy resins by polyoxyalkylene derivatives. Diglycidyl ethers of polyalkylene glycols having an epoxide equivalent weight of 180 to 500 are commercially available, especially those based on polypropylene glycols. Diepoxide compounds of polyphenols with various epoxide equivalent weights are widely known as commercial products. The most common types are based on epichlorohydrin and bisphenol A.

For the preparation of diepoxide compounds with polyoxyalkylene structures, it is further possible to react polyphenol epoxy resins with polyoxyalkylene glycols or with disecondary substituted or unsubstituted polyoxyalkylene polyamines. The preparation of suitable dialkylamines is described, for example, in U.S. application Ser. No. 07/570,624 filed Aug. 21, 1990 corresponding to AT-PS 392,648 or EP-A2-0,369,752. Disecondary amines, such as those obtained by reacting diprimary alkylenediamines or polyoxyalkylenediamines with the corresponding monoglycidyl esters or ethers, may also be used. These reactions also introduce into component (A) the desired alkyl and/or alkylene and/or hydroxyalkyl radicals having more than 3 carbon atoms.

The preferred components (A) have a schematic structure Z-Y-X-Y-Z, X representing the moiety of an aliphatic epoxy resin with polyoxyalkylene structures, Y a primary (hydroxy)alkylmonoamine or a secondary (polyoxy)alkylenediamine or a diphenol, and Z an epichlorohydrin-bisphenol A-epoxy resin.

50 to 100 mol% of the free epoxide groups of these epoxy resins of component (A) are reacted with a primary-tertiary diamine, preferably in the presence of an inert solvent. The preferred diamines for this purpose are N,N-dialkylaminoalkylamines, such as 2-dimethylaminoethylamine or homologous compounds. The preferred organic solvents are water-soluble or at least water-tolerating solvents which do not affect the reactions when the preparation is carried out under the conditions stated. Examples of such solvents are the glycol monoethers and glycol diethers or methyl isobutyl ketone.

Any epoxide groups remaining after reaction with a primary-tertiary diamine are reacted with primary or secondary amines, preferably with alkylamines and/or alkanolamines. For this purpose the primary amines are preferably used in such amounts that one mol of the amine is employed per epoxide group. The resultant secondary amino groups can be used in the next reaction stage, i.e., in the formation of oxazolidine rings. The reaction with the monoamines is preferably carried out at the same time as the reaction with the diamines.

The secondary β-hydroxyalkylamino compounds formed in the amine reaction are reacted in the next reaction stage with 50 to 100 mol% of formaldehyde with the formation of oxazolidine structures, 1 mol of water of reaction being in each case liberated per mol of formaldehyde used. The water of reaction is removed from the reaction mixture by azeotropic distillation with the aid of a removal agent, for example methyl isobutyl ketone.

To achieve water thinnability, the product is treated with an organic acid, the amount of the acid being 70–120 millimol per 100 g of solid resin, and preferably about 100 millimol per 100 g of solid resin. Formic acid, acetic acid, or lactic acid may be used as the acid. In general it has been established that when smaller amounts of acid are used, the solubility of the paste resin can be improved, but the optimum stability characteristics are not reached and pigment wetting is impaired. The product is adjusted to the desired application viscosity with water.

The products prepared according to the invention are used to prepare pigment pastes for cathodically depositable coating compositions. In addition to the pigments, the pastes may contain the customary additives such as wetting agents, antifoams, and the like.

The formulation of the pigment pastes and the choice and methods for grinding the pigments are known in the art. The final formulation of the pigment paste to a bath material or to a replenishing component is likewise carried out in a manner common in the art. Known products may be used for such purpose as principal binders, and the proportion of the paste resin may be between 5 and 50% by weight of the total resin in the composition. The methods for electrocoating are likewise known in the art.

The examples below illustrate the invention without limiting its scope. All parts and percentages are by weight, unless otherwise indicated.

EXAMPLE 1

(a) Preparation Of The Component (A)

258 parts of 2-ethylhexylamine (2 mol) are introduced into a suitable reaction vessel fitted with a stirrer, thermometer and distillation accessories, and are heated to 80° C. At 80° C., 380 parts of an aliphatic epoxy resin (based on polypropylene glycol, epoxy resin equivalent weight about 190) are added at a constant rate in the course of one hour, when the temperature rises to 120° C. The reaction is allowed to proceed for one hour at 120° C. 1175 parts of monoethylene glycol monobutyl ether are then added and when the reaction temperature is at 70° C., 1900 parts of an epoxy resin based on epichlorohydrin-bisphenol A (epoxide equivalent weight about 475) are then added. The mixture is again heated to 120° C. and the reaction is allowed to proceed at this temperature for 1½ hours. The intermediate contains 11% by weight of polyoxyalkylene structural units and 9% by weight of alkyl radicals having more than 3 carbon atoms.

(b) Preparation Of The Paste Resin 204 parts of 3-dimethylamino-1-propylamine (2 mol) are added to the intermediate obtained in (a) at a reaction temperature of 100° C. and the reaction is allowed to proceed for 1 hour at 100° C. After the addition of 314 parts of monoethylene glycol monobutyl ether and 66 parts of 91% paraformaldehyde (2 mol), about 36 parts of the water of reaction are distilled off at about 140° C. under azeotropic distillation conditions, using methyl isobutyl ketone as an entraining agent. The methyl isobutyl ketone is then removed under reduced pressure, and the residue is thinned with 774 parts of monoethylene glycol monobutyl ether to a 55% solids content.

EXAMPLE 2

(a) Preparation Of The Component (A)

In a suitable reaction vessel 640 parts of an aliphatic epoxy resin (based on polypropylene glycol, epoxide equivalent weight about 320) are added at a constant rate in the course of one hour at 80° C. to 238 parts of 2-amino-2-ethyl-1,3-propanediol (2 mol). During the addition the temperature rises to 120° C. After a reaction time of one hour at 120° C., 1278 parts of monoethylene glycol monobutyl ether are added and when the reaction temperature is at 70° C., 1900 parts of an epichlorohydrin-bisphenol A epoxy resin (epoxide equivalent weight about 475) are added. The reaction mixture is again heated to 120° C. and is kept at this temperature for 1½ hours, with stirring. The intermediate contains 19% by weight of polyoxyalkylene structures and 7.4% by weight of hydroxyalkyl radicals having more than 3 carbon atoms.

(b) Preparation Of The Paste Resin 204 parts of 3-dimethylamino-1-propylamine (2 mol) are added at 80° C., and the reaction is allowed to proceed for one hour at 100° C. 341 parts of monoethylene glycol monobutyl ether and 66 parts of 91% paraformaldehyde (2 mol) are then added. About 36 parts of the water of reaction are distilled off at a temperature of about 140° C. under azeo-tropic distillation conditions using methyl isobutyl ketone as an entraining agent. The methyl isobutyl ketone is then removed under reduced pressure, and the residue is thinned with 840 parts of monoethylene glycol monobutyl ether to a 55% solids content.

EXAMPLE 3

(a) Preparation Of The Component (A)

In a suitable reaction vessel 640 parts of an aliphatic epoxy resin (based on polypropylene glycol, epoxy resin equivalent weight about 320), 800 parts of an epoxy resin based on epichlorohydrin-bisphenol A (epoxide equivalent weight about 200), 456 parts (2 mol) of bisphenol A, and 3 parts of triethylamine are added at 80° C. to 905 parts of monoethylene glycol monobutyl ether. The reaction mixture is heated to 130° C. and kept at this temperature for 2 hours by stirring. The product contains 28% by weight of polyoxyalkylene structures.

(b) Preparation Of The Paste Resin 204 parts of 3-dimethylamino-1-propylamine (2 mol) are added at 80° C. to the intermediate prepared above, and the reaction is allowed to proceed for one hour at 100° C. 245 parts of monoethylene glycol monobutyl ether and 66 parts of 91% paraformaldehyde (2 mol) are then added. The resultant water of reaction is then azeotropically removed at a temperature of about 140° C. using methyl isobutyl ketone as entraining agent. When about 36 parts of water of reaction have been removed, the methyl isobutyl ketone is removed under reduced pressure. The residue is thinned at about 80° C. with 597 parts of monoethylene glycol monobutyl ether to a 55% solids content.

Preparation And Testing Of A Pigment Paste Obtained From The Products of Examples 1 to 3

The products prepared in Examples 1 to 3 were neutralized with 100 millimol of acetic acid/100 g of resin solids and thinned with deionized water to a 14% solids content.

A pigment paste is prepared in a laboratory sand mill using the following formulation:

| | |
|---|---|
| 1428.5 | parts of the 14% binder |
| 30 | parts of carbon black |
| 225 | parts of aluminum silicate pigment |
| 840 | parts of titanium dioxide |
| 105 | parts of lead silicate pigment |
| 2628.5 | parts of 53.3% pigment paste |

The formulations had a viscosity of about 20 seconds (DIN 53211/20° C.) and remained virtually unchanged after being stored at 50° C. for one week.

Preparation Of The Binder Dispersion

The binder for the binder dispersion used for the electrocoating paint is prepared on the basis of modified epoxy resins as follows:

(A) Preparation Of The Component A

In a reaction vessel provided with a stirrer, thermometer, dropping funnel and reflux condenser, 1000 g of an epoxy resin based on bisphenol A (epoxide equivalent about 500) is dissolved in 500 g of methyl isobutyl ketone (MIBK) at 60–70° C., and 0.2 g of hydroquinone and 168 g of methacrylic acid are added. The temperature is raised to 100–120° C., and the reaction is allowed to proceed at this temperature to an acid value of less than 3 mg KOH/g. 650 g of BMI, which is a 70% solution in MIBK of a basic monoisocyanate, prepared from 1 mol of toluylene diisocyanate and 0.9 mol of dimethylethanolamine, MW=254, are then added to the reaction product at 60–70° C., and the reaction is allowed to proceed to a NCO-value of virtually zero.

(B) Preparation Of The Component B

In a reaction vessel provided with a stirrer, thermometer, dropping funnel and reflux condenser, 400 g of an epoxy resin based on epichlorohydrin-bisphenol A (epoxide equivalent about 200) are dissolved in 172 g of MIBK and 210 g of diethanolamine (2 mol) are added at 60–70° C. When the exothermic reaction has subsided, the reaction is allowed to proceed for one hour at about 130° C. (reflux). The reaction product is subsequently reacted at 70–80° C. with 830 g of UMI, which is a 70% solution in MIBK of an unsaturated monoisocyanate, prepared from 1 mol of toluylene diisocyanate and 1 mol of hydroxyethyl methacrylate, MW=304, to an NCO-value of virtually zero.

Preparation Of The Dispersion

The components A and B are thoroughly mixed at 70° C. in an 80/20 ratio, and the mixture is neutralized with 30 millimol of formic acid per 100 g of solid resin. Most of the solvent MIBK is distilled off in vacuum at 80° C. The product is subsequently thinned with maximum stirring and at falling temperature with deionized water to about 45%. The dispersion is carried out vigorously at this concentration for 2 hours with cooling, and the solids content is determined. The product is subsequently further thinned to 35% with deionized water.

This preparation of the binder dispersion corresponds to the preparation of Example 1 of AT-PS 353,369.

Preparation Of An Electrocoating Paint Composition

A bath material for electrocoating paint was prepared from the following formulation:

| | |
|---|---|
| 1600.0 | parts of 35% of binder dispersion |
| 2872.5 | parts of deionized water |
| 527.5 | parts of 53.3% pigment paste from Examples 1 to 3 |
| 5000.0 | parts of paint |

The paints had a solids content of 16.8% and a pH of 6.0–6.2. The paints were homogenized by stirring for 25 hours and were then filtered through a weighed perlon sieve (mesh size 30 μm). The sieve residue was 8 mg per litre of bath material.

Zinc-phosphated steel panels were coated with the paints under the following bath conditions and stoved:

Bath temperature . . . 28–30° C.

Coating voltage . . . 300 V

Coating time . . . 2 minutes

Stoving conditions . . . 15 minutes/180° C.

Film thickness . . . 23–25 μm The films had a smooth surface and were tested for corrosion resistance by the VDA Test Method 621-415. After 10 cycles an undermigration of not more than 2 mm from the cross-cut occurred in all cases.

Deposition on a steel panel bent at a right angle (L-panel test) gave smooth surfaces even on a horizontal section of the panel (no pigment sedimentation). A repeat of the tests after an aging period of 3 weeks (at room temperature) gave virtually identical results.

As will be apparent to one skilled in the art, various modifications can be made within the scope of the aforesaid description. Such modifications being within the ability of one skilled in the art form a part of the present invention and are embraced by the appended claims.

It is claimed:

1. Process for the preparation of pigment paste resins for cathodically depositable coating compositions, comprising reacting (A) at least one diepoxide compound which has the schematic structure

Z - Y - X - Y - Z, wherein X is the moiety of an aliphatic diepoxy resin which has polyoxyalkylene structures and which remains after reacting the epoxy groups, Y is the moiety of a primary (hydroxy)alkylmonoamine or a secondary (poly-oxy) alkylenediamine or a diphenol, and Z is the moiety of an epichlorohydrin-bisphenol A-epoxy resin, which contain(s), based on the total weight of the diepoxide compound 10 to 50% by weight of polyoxyalkylene structures, and up to 20% by weight of alkyl or alkylene or hydroxyalkyl radicals with more than 3 carbon atoms, and has a glass transition temperature between 10 and 40° C., with (B) 50 to 100 mol%, based on the epoxide groups in (A), of a primary-tertiary diamine and, thereafter, (C) reacting 50 to 100 mol% of formaldehyde, based on the total of the primary amino groups of the amines used in (B), with the reaction product of (B) to form oxazolidine structures, said process being completed without quaternization.

2. Process according to claim 1 wherein said alkyl, alkylene, or hydroxyalkyl radicals with more than 3 carbon atoms comprise from 5 to 15% by weight of component (A).

3. Process according to claim 1 wherein said primary-tertiary diamine is an N,N-dialkylaminoalkylamine.

4. Pigment paste resin made by the process of claim 1.

5. Pigment paste resin made by the process of claim 2.

6. Pigment paste resin made by the process of claim 3.

7. A cathodically depositable coating composition containing as the pigment paste resin a pigment paste resin of claim 4.

8. A cathodically depositable coating composition containing as the pigment paste resin a pigment paste resin of claim 5.

9. A cathodically depositable coating composition containing as the pigment paste resin a pigment paste resin of claim 6.

* * * * *